Oct. 6, 1964

G. W. SULLIVAN 3,151,369

PROCESS FOR MAKING MOLDS

Filed March 29, 1963

INVENTOR.
GEORGE W. SULLIVAN
BY
ATTORNEY

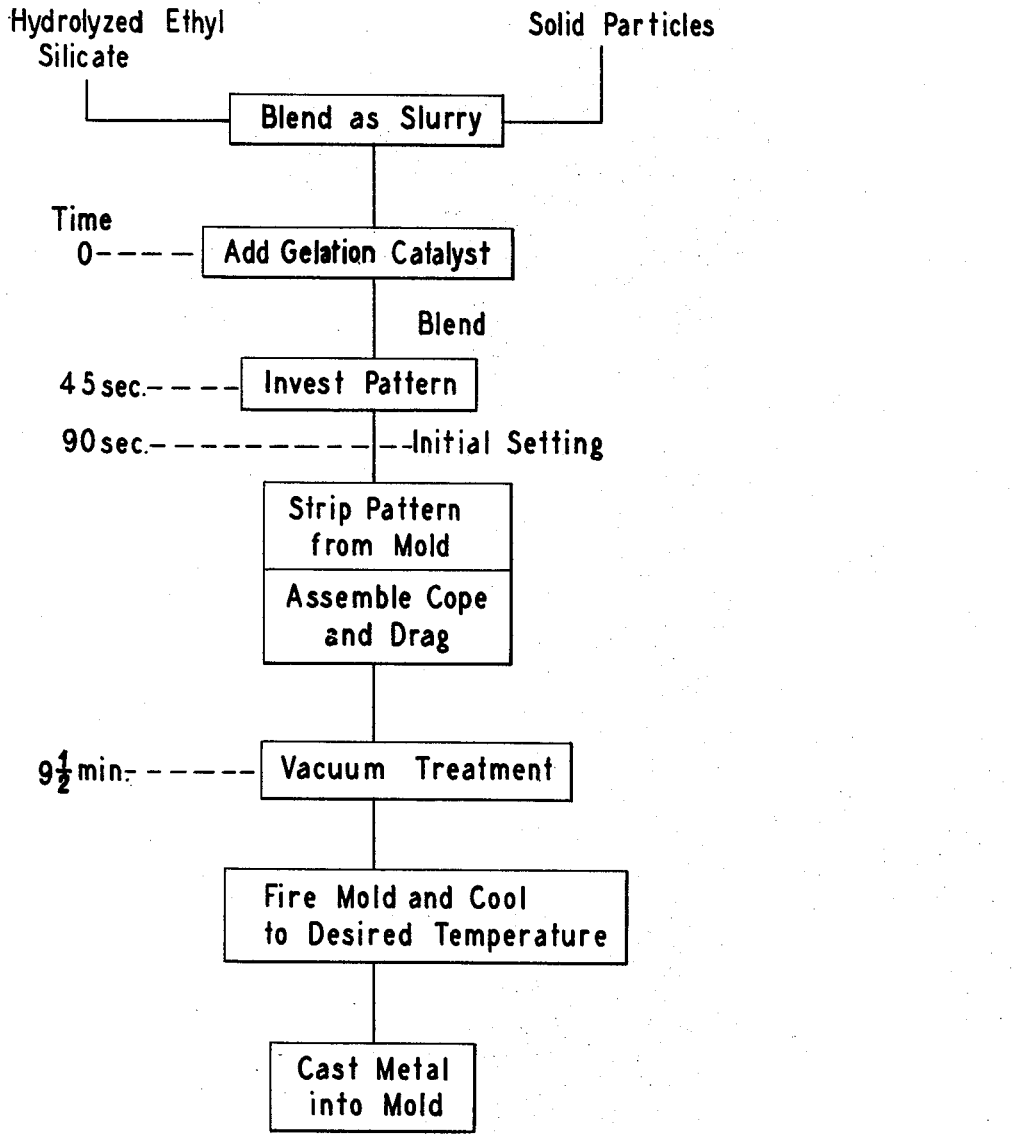

United States Patent Office 3,151,369
Patented Oct. 6, 1964

3,151,369
PROCESS FOR MAKING MOLDS
George W. Sullivan, Kokomo, Ind., assignor to Union Carbide Corporation, a corporation of New York
Filed Mar. 29, 1963, Ser. No. 269,050
1 Claim. (Cl. 22—193)

The present invention relates to the manufacture of molds for the casting of metal articles. More particularly, the present invention relates to the manufacture of molds for the casting of metal articles having intricate shapes and back drafts such as gas turbine and supercharger wheels.

At the present time, various techniques are available for the manufacture of molds for the casting of intricate metal shapes, including the so-called "lost-wax" process. However, such techniques represent relatively expensive and time-consuming operations, particularly since an individual, expendable, mold pattern is required for the manufacture of each mold.

It is therefore an object of the present invention to provide a low cost and rapid method for making molds.

It is another object to provide a low cost and rapid method for making molds for the casting of intricate metal shapes such as gas turbine and supercharger wheels.

Other objects will be apparent from the following description and claims taken in conjunction with the drawing in which:

FIGURE 4 is a flow diagram for a particular embodiment of the present invention.

A process for making molds in accordance with the present invention comprises providing a pattern formed of an elastomeric material having a hardness the equivalent of between 65 and 100 D-scale durometer, investing the pattern with a hardenable hydrolyzed ethyl silicate refractory particle-containing slurry; causing said invested slurry to undergo gelation; and removing the pattern from contact with the invested material after it has achieved its initial set and before it has exceeded 95 percent of its final hardness.

Figure 1:
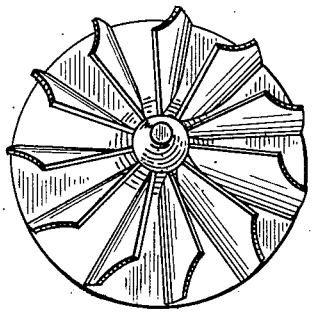
FIGURE 1 shows a resilient pattern for a mold for the manufacture of supercharger wheels.
Figure 2:
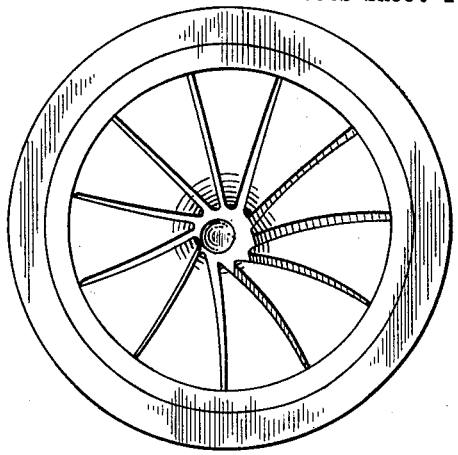
FIGURE 2 illustrates a type of mold which can be readily manufactured by the process of the present invention.

In the practice of the present invention, a pattern, such as illustrated in FIGURE 1 of the drawing, is prepared from elastomeric material such as polyurethane. Other materials such as natural and synthetic rubbers, epoxies and polyesters can also be used. However, it is essential in the practice of the present invention that the pattern material have a hardness the equivalent of between 65 to 100 D-scale Durometer.[1] Materials with lower hardness values do not permit suitable dimensional control of the molds and in addition are permanenty deformed by the forces developed during gelation and hardening of the mold. On the other hand, materials with higher hardness values are not sufficiently flexible for use in the present process and result in damage to the molds and to the pattern upon withdrawal of the pattern from the mold.

The preferred hardness for the pattern material of the present invention is 70 to 90 D-scale Durometer. Particularly suitable commercially available materials for fabrication of patterns in accordance with the present invention are Adiprene[2]+Moca,[2] and Multrathane[3] +Moca.[2] Adiprene is a reaction product of di-isocyanate and a polyalkylene ether glycol; Multrathane is a solid synthetic resin; Moca is a curing agent, methylene-bis-ortha chloroaniline.

When the elastomeric pattern has been prepared, which can be done by conventional techniques such as casting or injection molding, it is invested with a hardenable hydrolyzed ethyl silicate, refractory-containing slurry. The preferred ethyl silicate and slurry compositions are shown in Tables I and II respectively.

Table I

| Ingredient: | Weight percent |
|---|---|
| Ethyl silicate, Grade 40 | 60 |
| Commercial denatured alcohol | 32 |
| Water | 7.92 |
| Hydrochloric acid | 0.08 |

Table II

| | Weight percent |
|---|---|
| Hydrolyzed ethyl silicate | 20 |
| 325 mesh tabular alumina | 40 |
| 50 mesh mullite | 40 |

In the present invention, the hydrolyzed ethyl silicate can be prepared by known practices, for example as described in U.S. Patent 2,027,932.

Also, the refractory particles in the slurry can be any of the usual materials used in the preparation of molds, e.g. silica, zircon or zirconia, titania, olivine, in addition to the previously mentioned mullite and alumina.

The proportion of refractory material to hydrolyzed ethyl silicate in the slurry can vary in accordance with the usual practice in preparing molds from these materials, for example, the hydrolyzed ethyl silicate can conveniently be present in amounts constituting from 15 to 25 percent by weight of the slurry. The preferred amount of hydrolyzed ethyl silicate is 18–22 percent. As regards the hydrolyzed ethyl silicate binder, ethyl silicate may constitute between 50 and 70 parts by weight.

Generally speaking, the relative proportions of the slurry materials are not critical so long as the slurry will undergo gelation and harden upon the addition of a gelation agent. Ordinarily, relatively short gelation periods are preferred on the order of five minutes or less.

The investing of the elastomeric pattern with the hydrolyzed ethyl silicate slurry is accomplished in accordance with usual techniques and a gelation agent is added to the slurry prior to investment. A preferred gelation agent is a mixture of 73 parts alcohol to 27 parts concentrated ammonium hydroxide and the preferred amount of gelation agent used is that which will provide a relatively short gelation time. The addition of 1–2 parts per hundred of the aforementioned gelation agent to the slurry composition of Table II provides an initial setting time of about 90 seconds and the slurry material achieves about 95 percent of its final hardness[4] in about 10 minutes, under room temperature conditions. In general, the use of increased amounts of gelation agent will shorten these times and vice versa. Other suitable gelation agents which may be used in the practice of the present invention include ammonium carbonate and sodium hydroxide.

In practice, the investment of the pattern is accomplished promptly after the gelation agent is added to the slurry since gelation begins almost immediately. During

---

[1] Durometer as specified herein conforms to ASTM designation D676–55T; Durometers are available from the Shore Instrument and Manufacturing Co., Jamacia, New York, whose Bulletin R–12 describes the use of Durometers.

[2] Trademark of E. I. du Pont de Nemours and Co.
[3] Trademark of Mobay Chemical Co.
[4] Hardness of the slurry material is determined in accordance with section 9, pp. 96–98 of Foundry-Sand Handbook, sixth edition, 1952, American Foundrymen's Society, Chicago, Illinois.

gelation, the slurry achieves an initial set which occurs about 90 seconds after adding 1–2 parts of the preferred gelation agent to the slurry composition of Table II. When this condition is reached, the slurry has assumed a shape corresponding to the pattern and has enough strength to be self-supporting. (This condition represents Zero green hardness.)

Also, most importantly, the molded slurry is deformable and resilient to the extent that the elastomeric pattern can be easily removed from the mold at this stage without danger of breakage to the mold or undue wear or stress on the pattern. The condition of the mold, during which it exhibits suitable resiliency to permit removal of the pattern without damage either to the pattern or mold, persists until the hardness of the mold exceeds about 95 percent of its final hardness. This occurs about 10 minutes after the addition of the preferred gelation agent to the composition of Table II.

After the hardness of the mold exceeds 95 percent of its final value, the pattern cannot ordinarily be withdrawn without detrimentally affecting the mold or pattern when working with relatively complex shapes as illustrated in the drawing.

Consequently, in the practice of the present invention, the elastomeric pattern is removed from the mold after the time of the initial setting of the slurry, and before the slurry exceeds 95 percent of its final hardness. That is, the pattern is removed from the mold during the time that both the mold and the pattern are resiliently deformable. Using the preferred materials of this invention, the pattern is removed between about 90 seconds and 10 minutes after the addition of the gelation agent to the slurry.

In a particular molding operation using a polyurethane elastomer pattern of the configuration shown in FIGURE 1 of the drawing, and following the aforedescribed procedure, the same pattern was used to make 75 molds. The molds were of excellent quality, and the pattern was still in a condition suitable for further use.

When employing elastomeric patterns in the aforedescribed manner it is of course very important to know when the pattern can be safely withdrawn from the mold. Since the times of initial setting and the attainment of 95 percent of final hardness will vary depending on the amount of gelation agent used and to some extent on the slurry composition, these times must be determined for the particular hardenable slurry involved. This can be determined directly by observing the setting of the mold and by hardness measurements on the mold during gelation. However, most often this can be more conveniently performed indirectly. For example, one technique is to prepare a sample corresponding to the particular slurry composition to be used, adding gelation agent and noting the elapsed time until the slurry achieves its initial set. This can be done visually. Then, after initial setting (Zero green hardness), periodic hardness measurements are taken, and the elapsed time noted, until the material achieves final hardness. A Dietert Dry Scratch Hardness Tester, Model No. 763 can be conveniently used for this purpose. A hardness number of 95, using the Hardness Tester, indicates 95 percent of final hardness.

The thus obtained time-hardness relationship can then be applied to the casting of molds from the same material.

Figure 3:
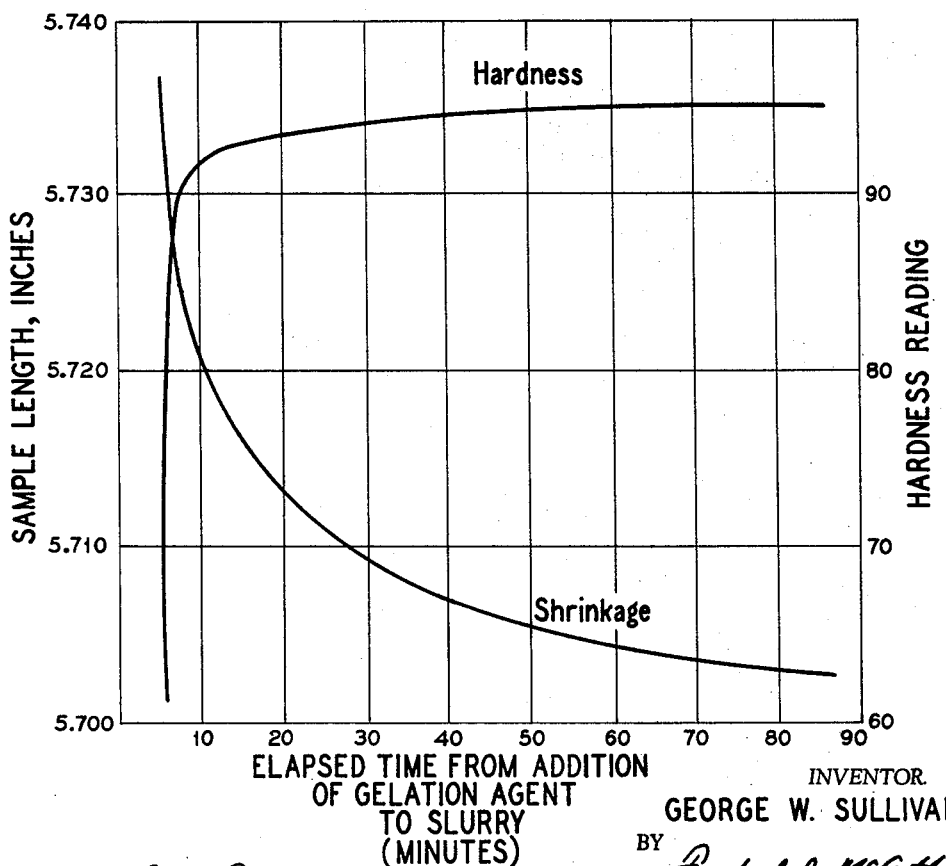
FIGURE 3 is a graph showing the hardness and shrinkage characteristics of a mold material employed in the practice of the present invention.

A graph obtained following such a technique, at room temperature and atmospheric pressure, is shown in FIGURE 3. The hardness scale for the graph corresponds to readings from the Hardness Tester in accordance with the procedure of the Foundry Sand Handbook.

The slurry tested was the composition of Table II using 1–2 parts per hundred of the preferred alcohol-ammonium hydroxide gelatin agent. The particular samples tested were cast in the form of bars about 5¾ inches long and 1 inch square in cross-section. When using this particular slurry material, the pattern is preferably removed before about 8 minutes have elapsed.

It can be seen that shrinkage of the sample slurry is also plotted in the graph of FIGURE 3. This information is significant and can be used in a similar manner in the practice of a further embodiment of the present invention which involves the use of a vacuum treatment subsequent to pattern removal and before final hardening of mold.

In the practice of this embodiment of the present invention, after the slurry has been prepared and the pattern invested and removed in the manner aforedescribed, and before the mold has achieved its final hardness, i.e. gelation is still in progress, the mold is subjected to vacuum conditions. The vacuum provided is such that volatiles, e.g. alcohol and water vapor, are removed from the mold via the mold surface. When volatiles in the amount of about 1 percent by weight of the invested material have been removed, the shrinkage of the mold surface ceases. Also, concurrently, the hardness of the mold surface increases to about its final value.

It has been found that a vacuum treatment at 2 inches of Hg pressure, or less, provided sufficient volatile removal in accordance with the present invention to cause shrinkage to be arrested and cease at the mold surface before the end of the vacuum processing and resulted in a 35 percent increase in shear strength in the mold as compared to the strength obtained without vacuum processing. The particular mold treated in this instance was of the type shown in the drawing and the materials used were the preferred compositions previously disclosed. The pattern was removed 8 minutes after addition of the gelation agent at which time the vacuum treatment was initiated.

A particular advantage of this latter embodiment of the present invention is that it provides dimensional control for the mold. Also the green strength of the mold is increased almost immediately to its ultimate enhanced value and mold processing time is materially shortened.

Further, alcohol and vapor removal by vacuum processing in accordance with the present invention is more uniform than that provided by such techniques as ignition, rapid heating, hot air blasts and the like, and as a result the mold has more uniform hardness and strength, and greater dimensional accuracy and control is provided. Moreover, the uniform withdrawal of volatiles from the mold yields a casting surface having minute interstices which provide advantageous permeability to the mold. The interstices are very small and do not adversely affect the surface of cast articles.

In order to obtain the aforementioned benefits as a result of vacuum processing, the vacuum treatment should be conducted before the mold has exceeded 95 percent of its final hardness. In the preferred practice of the present invention, the pattern removal and vacuum processing are done as soon as practically possible after the initial setting of the mold.

It has been stated previously that vapor removal of about 1 percent by weight of the invested material will provide effective cessation of mold shrinkage and concurrent strengthening of the mold. In practice, it is preferred that the vapor removal during vacuum treatment be between 1½ percent and 10 percent, preferably 3.5 percent, to avoid the possibility of premature termination of the vacuum processing. Continuing the vacuum treatment for longer periods, up to the complete removal of liquid from the mold is not detrimental to the mold but it is unnecessary since the vacuum treatment of this invention is primarily a surface effect. In fact, by discontinuing the vacuum processing before total removal of volatiles and thus permitting further uncontrolled shrinkage in the mold structure behind the hardened surface, voids may be developed in the body of the mold which advantageously increases its permeability.

Further as regards the vacuum processing treatment of this invention, it is to be noted that the alcohol and vapor removal is essentially a surface phenomena which halts chemical reactions at the mold surfaces and thus "fixes" the mold surface dimensions at a value corresponding to the time when about 1 percent of the volatiles have been removed.

It is to be understood that the green molds produced in the practice of the present invention are fired and manipulated in accordance with standard techniques, subsequent to vacuum processing.

To further illustrate the practice of the present invention reference is taken to FIGURE 4 which shows an exemplary flow diagram for the process of the present invention as applied to the preferred compositions hereinbefore described.

With reference to FIGURE 4, the hydrolyzed ethyl silicate and refractory particles are blended into a slurry and the gelation agent is added and blended. Then, before initial setting, an elastomeric pattern in accordance with the present invention is invested with the slurry. Subsequent to initial setting of the slurry at 90 seconds after addition of the gelation agent, and before the slurry has more than 95 percent of its final hardness, the pattern is stripped from the mold. The cope and drag portions of the mold are conveniently assembled at this time, and vacuum treatment is commenced at about 8 minutes after the addition of the gelation agent.

Upon completion of the vacuum processing, as aforedescribed, the mold can be stored and subsequently fired at a suitable temperature, e.g. 1000° to 2000° F. and used in casting metal shapes.

A further advantage of the present invention, as compared to the "lost wax" technique, is the lower cost of operation. Studies have shown that the cost of supercharger wheel molds manufactured by the process of the present invention is about ⅓ the cost using the "lost wax" process. Also there is a substantial savings in time with the process of the present invention.

The mesh series referred to in the foregoing description is U.S. Series.

What is claimed is:

A process for making molds which comprises providing a pattern formed of a resilient elastomeric material having a hardness the equivalent of between 65 and 100 D-scale durometer; investing the pattern with a hardenable hydrolyzed ethyl silicate, refractory-containing slurry; causing said invested slurry to undergo gelation; removing the resilient pattern from contact with the invested material after it has achieved its initial set and before it has achieved more than about 95 percent of its final hardness; and completing the gelation of the invested material under a vacuum pressure of up to about 2 inches of Hg pressure to thereby remove volatiles therefrom.

References Cited in the file of this patent
UNITED STATES PATENTS

| | | |
|---|---|---|
| 2,274,186 | Brace | Feb. 24, 1942 |
| 2,380,945 | Collins | Aug. 7, 1945 |
| 2,476,726 | Haas | July 19, 1949 |
| 2,491,146 | Zahn | Dec. 13, 1949 |
| 2,509,692 | Miller | May 30, 1958 |
| 2,983,004 | Spier et al. | May 9, 1961 |